United States Patent
Baughman et al.

(10) Patent No.: US 11,856,592 B2
(45) Date of Patent: Dec. 26, 2023

(54) MULTI-DIMENSIONAL MAPPING AND USER COGNITIVE PROFILE BASED DEVICE CONTROL AND CHANNEL ASSIGNMENT

(71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); Diwesh Pandey, Bangalore (IN); Subarna Ghosh, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 17/452,406

(22) Filed: Oct. 27, 2021

(65) Prior Publication Data

US 2023/0127067 A1 Apr. 27, 2023

(51) Int. Cl.
*H04W 72/51* (2023.01)
*H04W 84/12* (2009.01)
*H04W 64/00* (2009.01)

(52) U.S. Cl.
CPC ......... *H04W 72/51* (2023.01); *H04W 64/006* (2013.01); *H04W 84/12* (2013.01)

(58) Field of Classification Search
CPC ... H04W 72/51; H04W 64/006; H04W 84/12; H04W 76/10; G06N 3/08; H04L 67/306
See application file for complete search history.

(56) References Cited

U.S. PATENT DOCUMENTS

| | | | | |
|---|---|---|---|---|
| 9,353,965 B1* | 5/2016 | Goyal | ..................... | G06F 3/011 |
| 9,411,780 B1* | 8/2016 | Awad | ........................ | G06T 7/62 |
| 10,127,492 B1* | 11/2018 | Chitiveli | ................. | B66B 1/468 |
| 10,965,805 B1 | 3/2021 | Anand | | |
| 2007/0266246 A1* | 11/2007 | Lee | ..................... | H04W 12/069 |
| | | | | 713/168 |

(Continued)

FOREIGN PATENT DOCUMENTS

| | | | | |
|---|---|---|---|---|
| AU | 2014275495 A1 * | 12/2015 | ........... | G06F 16/176 |
| CA | 2874771 A1 * | 12/2013 | ............. | G01S 19/10 |

(Continued)

OTHER PUBLICATIONS

Inferring user profile attributes from multidimensional mobile phone sensory data. IEEE Internet Things J. (Jun. 1, 2019), vol. 6, No. 3, pp. 5152-5162. (Year: 2019).*

(Continued)

*Primary Examiner* — Yuwen Pan
*Assistant Examiner* — Swati Jain
(74) *Attorney, Agent, or Firm* — Teddi E. Maranzano

(57) ABSTRACT

The present invention may include a computing device receives a location data from a client device, wherein the client device comprises one or more location sensors to generate the location data. The computing device determines an altitude of the client device above a floor from the location data. The computing device determines an age and a height of a user using a trained neural network from the client device and the location data and assigns a wireless network channel to the client device based on the age and the height of the user.

20 Claims, 6 Drawing Sheets

(56) References Cited

U.S. PATENT DOCUMENTS

| | | | | |
|---|---|---|---|---|
| 2008/0299900 A1* | 12/2008 | Lesyna | ............... | H04M 1/66 455/26.1 |
| 2013/0013093 A1* | 1/2013 | Murphy | ............... | A63F 13/46 700/91 |
| 2013/0102283 A1* | 4/2013 | Lau | ............... | G06Q 30/0269 455/411 |
| 2013/0135097 A1* | 5/2013 | Doezema | ............... | G08B 21/0446 340/539.11 |
| 2013/0257650 A1* | 10/2013 | Miyake | ............... | G01S 19/14 342/357.31 |
| 2013/0314238 A1* | 11/2013 | Li | ............... | G08B 19/00 340/669 |
| 2015/0063202 A1* | 3/2015 | Mazzarella | ............... | H04W 4/90 370/316 |
| 2015/0330805 A1* | 11/2015 | Cho | ............... | H04W 4/02 701/428 |
| 2016/0069679 A1* | 3/2016 | Jackson | ............... | G01C 5/00 702/160 |
| 2016/0109582 A1* | 4/2016 | Sendonaris | ............... | G01S 19/46 455/456.1 |
| 2016/0140834 A1* | 5/2016 | Tran | ............... | A43B 3/48 340/539.11 |
| 2016/0162751 A1* | 6/2016 | You | ............... | G06V 10/464 382/190 |
| 2016/0322078 A1* | 11/2016 | Bose | ............... | G01P 13/00 |
| 2016/0380954 A1* | 12/2016 | Dugan | ............... | H04L 51/52 709/206 |
| 2017/0060369 A1* | 3/2017 | Goyal | ............... | F24F 11/30 |
| 2017/0108236 A1* | 4/2017 | Guan | ............... | G05B 19/042 |
| 2017/0122744 A1* | 5/2017 | Long | ............... | G01C 21/206 |
| 2017/0176961 A1 | 6/2017 | Tirpak | | |
| 2018/0067536 A1 | 3/2018 | Toksvig | | |
| 2018/0245916 A1* | 8/2018 | Ivanov | ............... | G01S 19/50 |
| 2018/0285442 A1* | 10/2018 | Coleman | ............... | G16H 10/20 |
| 2019/0108740 A1* | 4/2019 | Coke | ............... | G01S 13/726 |
| 2019/0268777 A1* | 8/2019 | Simon | ............... | H04N 21/6131 |
| 2019/0385570 A1 | 12/2019 | Huberman | | |
| 2020/0008159 A1* | 1/2020 | Kosseifi | ............... | B64C 39/024 |
| 2020/0193591 A1* | 6/2020 | Kamiyama | ............... | G06T 7/60 |
| 2020/0281480 A1* | 9/2020 | Tran | ............... | A61B 5/6813 |
| 2020/0342737 A1* | 10/2020 | Pham | ............... | A61B 5/0205 |
| 2021/0232661 A1* | 7/2021 | Gupta | ............... | G06F 21/35 |
| 2021/0321222 A1* | 10/2021 | Lagace | ............... | G01S 13/56 |
| 2021/0406913 A1* | 12/2021 | Yao | ............... | G06N 20/00 |
| 2022/0053506 A1* | 2/2022 | Matsuki | ............... | G05D 1/0022 |
| 2022/0171845 A1* | 6/2022 | Kumar | ............... | G06F 21/50 |
| 2023/0126571 A1* | 4/2023 | Kirti | ............... | H04L 63/102 726/22 |

FOREIGN PATENT DOCUMENTS

| | | | | |
|---|---|---|---|---|
| CA | 3080600 A1 * | 7/2016 | ............... | A61B 3/16 |
| CA | 3092249 A1 * | 8/2019 | ............... | H04H 20/423 |
| CA | 3100879 A1 * | 11/2019 | ............... | G06N 20/00 |
| CA | 3031040 C * | 2/2021 | ............... | A63B 24/0003 |
| EP | 1123618 B1 * | 10/2004 | ............... | H04M 15/00 |
| EP | 1183823 B1 * | 7/2006 | ............... | H04L 12/2805 |
| EP | 1691523 A1 * | 8/2006 | ............... | H04L 63/0815 |
| EP | 3327953 A1 * | 5/2018 | ............... | B64D 47/08 |
| EP | 2929666 B1 * | 3/2021 | ............... | G06F 21/552 |
| JP | 2005323070 A * | 11/2005 | | |
| WO | WO-2014159131 A2 * | 10/2014 | ............... | G05B 15/02 |
| WO | WO-2016085405 A1 * | 6/2016 | | |
| WO | WO-2021021920 A1 * | 2/2021 | ............... | A61B 5/021 |
| WO | WO-2022060948 A1 * | 3/2022 | ............... | A61B 5/02055 |

OTHER PUBLICATIONS

Brdiczka et al., "Detecting Human Behavior Models From Multimodal Observation in a Smart Home," IEEE Transactions On Automation Science and Engineering, vol. 6, No. 4, Oct. 2009, pp. 588-597.

Han et al., "User-friendly home automation based on 3D virtual world," IEEE Transactions on Consumer Electronics, vol. 56, Issue: 3, Aug. 2010, pp. 1843-1847.

Mell, et al., "The NIST Definition of Cloud Computing", National Institute of Standards and Technology, Special Publication 800-145, Sep. 2011, 7 pages.

* cited by examiner

MULTI-DIMENSIONAL MAPPING AND USER COGNITIVE PROFILE BASED DEVICE CONTROL AND CHANNEL ASSIGNMENT

BACKGROUND

The present invention relates, generally, to the field of computing, and more particularly to altitude-based cognitive device control.

A wireless network 802.11 standard provides several distinct radio frequency ranges for use in Wi-Fi communications. Each range is typically divided into a multitude of channels. In the standards, channels are numbered at 5 MHz spacing within a band (except in the 60 GHz band, where they are 2.16 GHz apart), and the number typically linearly relates to the frequency of the channel. The wireless local area network (WLAN) channels are frequently accessed using the IEEE 802.11 protocols, and typically called a Wi-Fi network with a similar channeling available for Bluetooth networks.

SUMMARY

According to one embodiment, a method, computer system, and computer program product for an altitude-based device control is provided. The present invention may include a computing device receives a location data from a client device, wherein the client device comprises one or more location sensors to generate the location data. The computing device determines an altitude of the client device above a floor from the location data. The computing device determines an age and a height of a user using a trained neural network from the client device and the location data and assigns a wireless network channel to the client device based on the age and the height of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
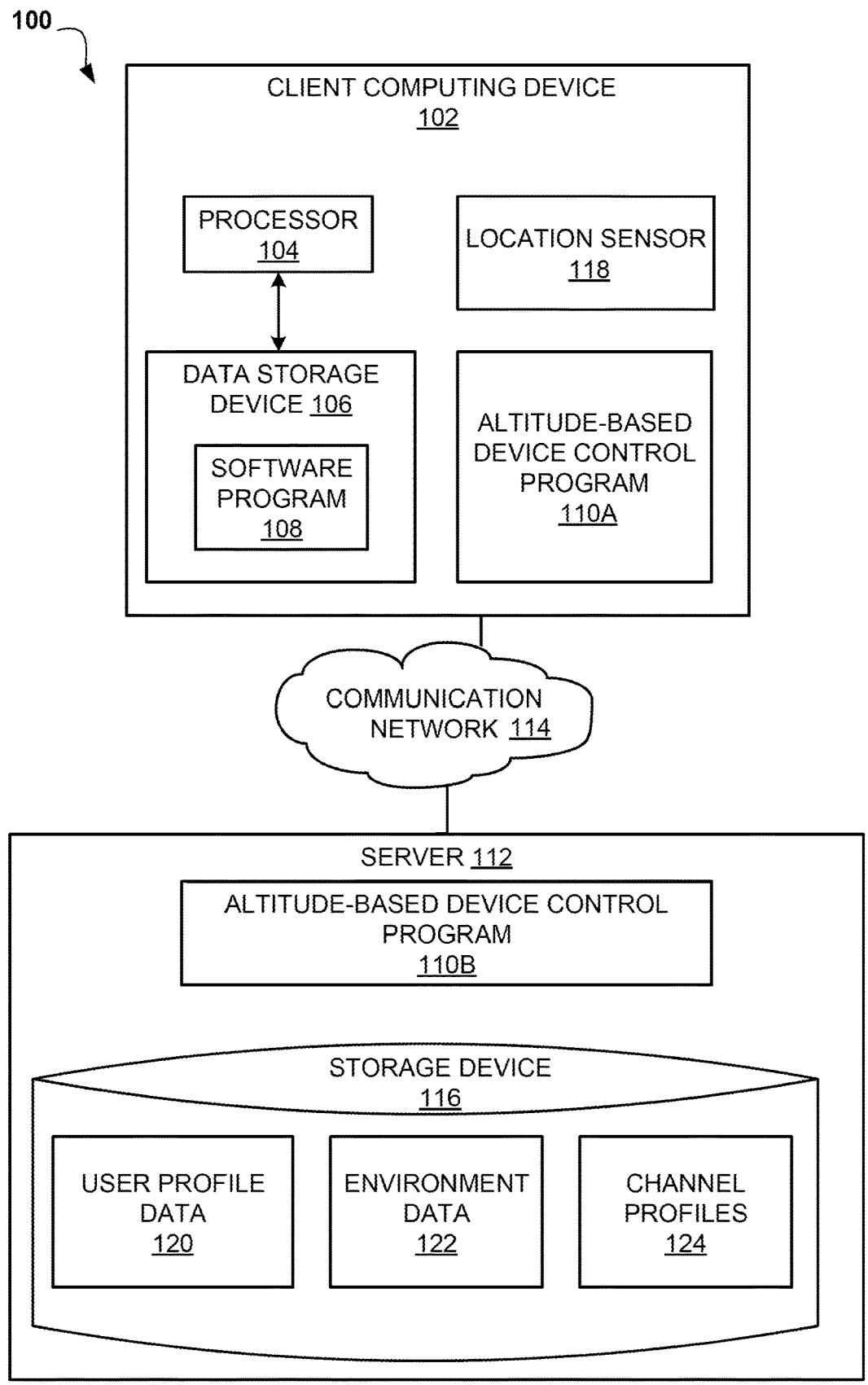
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to altitude-based cognitive device control. The following described exemplary embodiments provide a system, method, and program product to, among other things, map an environment and, based on the altitude of a client device or a height of a user, assign a specific channel that is associated with a device control profile. Therefore, the present embodiment has the capacity to improve the technical field of device control by restricting a usage of one or more devices in an environment based on an altitude of a device and cognitive functions of the user.

As previously described, a wireless network 802.11 standard provides several distinct radio frequency ranges for use in Wi-Fi communications. Each range is typically divided into a multitude of channels. In the standards, channels are numbered at 5 MHz spacing within a band (except in the 60 GHz band, where they are 2.16 GHz apart), and the number typically linearly relates to the frequency of the channel. The wireless local area network (WLAN) channels are frequently accessed using the IEEE 802.11 protocols, and typically called a Wi-Fi network with a similar channeling available for Bluetooth networks.

Typically, network and device security, such as child control for a device, is used or triggered when a user approaches a specific area or during a specific time frame. For example, an internet access may be limited for a specific device or turned off during a specific timeframe. Sometimes, a map of the environment is used in order to limit access to one or more devices connected to a network, such as blocking calls in a class room. However, the third dimension, such as an altitude in an environment, remains underutilized. Thus, the altitude, such as a height of a user or an altitude of the device above the floor, may be used in order to differentiate users and limit their access to the network resources. As such, it may be advantageous to, among other things, implement a system that assigns various channels of a wireless network based on an altitude of the device, where each channel has a specific security profile, and connects the client device to one of the channels to based on the determined altitude of a device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine all of the devices in an environment and based on an altitude of a client device assign different wireless network channels to the client device in order to enable network restrictions and device control.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104, a location sensor 118 and a data storage device 106 that is enabled to host and run a software program 108 and an altitude-based device control (ABDC) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, a smart watch or any type of computing device capable of running a program and accessing a network. In another embodiment, although not depicted in FIG. 1, client computing device 102 may be a geotag having the location sensor 118 capable of transferring at least a location or other data that may be converted to a location of the geotag to the server 112. As will be discussed with reference to FIG. 4, the client computing device 102 may include internal components 402a and external components 404a, respectively. The location sensor 118 may be one or more sensors capable of determining an altitude of the device above ground such as an accelerometer, a barometer, a wireless antenna capable of identifying a location using triangulation, a camera, a range determining sensor such as LIDAR, and a global positioning sensor (GPS).

The server computer 112 may be a laptop computer, netbook computer, personal computer (PC), a desktop computer, or any programmable electronic device or any network of programmable electronic devices capable of hosting and running an altitude-based device control (ABDC) program 110B and a storage device 116 and communicating with the client computing device 102 via the communication network 114, in accordance with embodiments of the invention. The storage device 116 may host user profile data 120, environment data 122 and channel profiles 124. The user profile data 120 may be a database that stores all of the information collected about the user by the ABDC program 110A, 110B such as age of a user, height of a user, client devices associated with the user and a cognitive score of a user. The environmental data 122 may be a database that stores a digital representation of a 3D map of one or more of the environments such as offices and homes with links to associated to each environment one or more users, devices and network infrastructure equipment. The environment data 122 may include locations of one or more wireless network routers, switches, smart devices, geotags and other devices that are connected to the network, including a location of each static device and restrictions related to age of a user of the device. The channel profiles 124 may be a record or database storing all of the available channels of wireless networks in each of the environments stored in environment data 122 and associated with each channel restrictions or device control settings. In another embodiment, channel profiles 124 may be incorporated into environment data 122. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the altitude-based device control (ABDC) program 110A, 110B may be a program capable of identifying an altitude associated with the user, such as height of the user, and, based on the altitude and other data available about the user, assign a wireless network channel to the user that corresponds to the channel restrictions. The altitude-based device control method is explained in further detail below with respect to FIG. 2.

Figure 2:
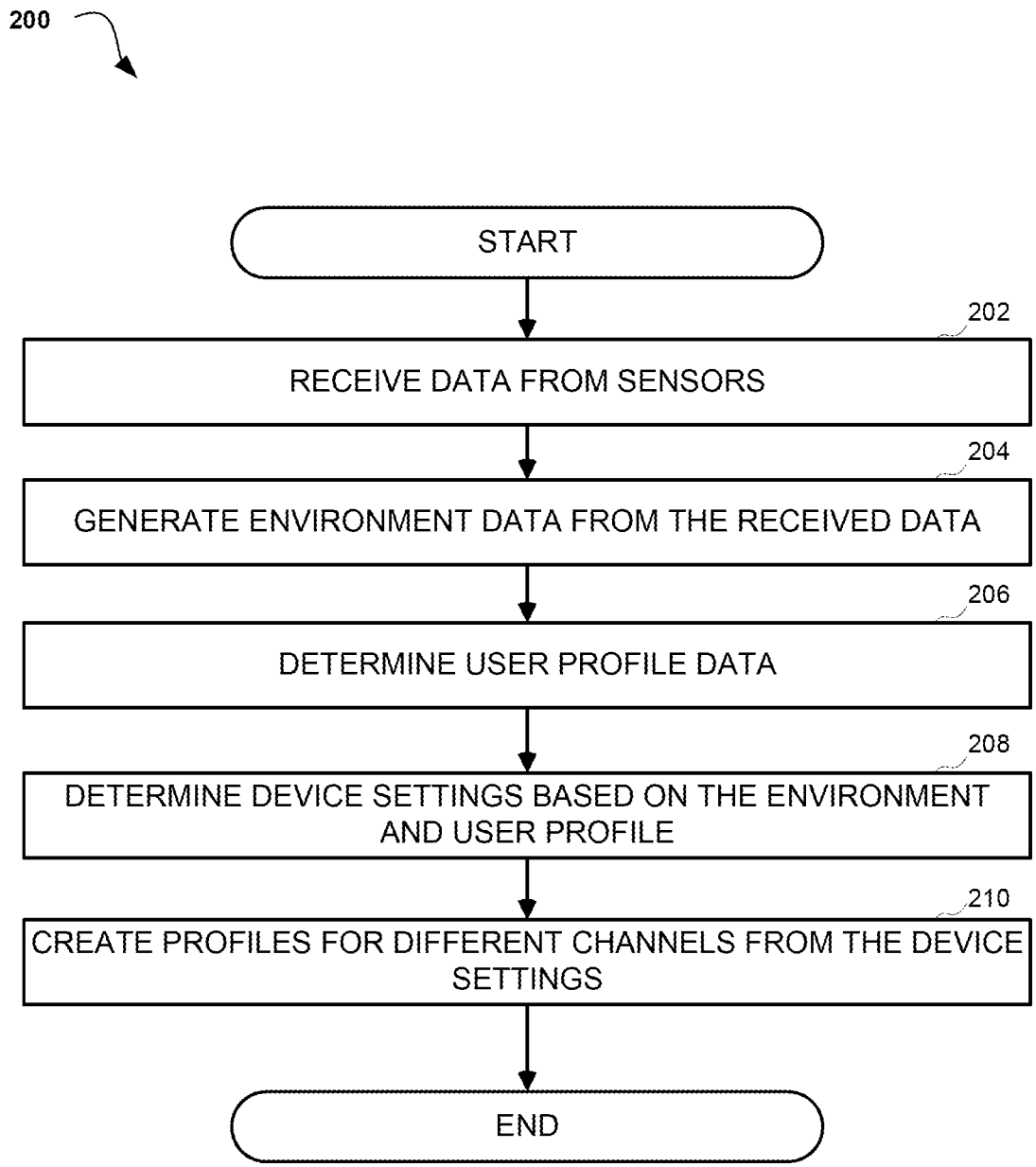
FIG. 2 is an operational flowchart illustrating an initialization process according to at least one embodiment.

Referring now to FIG. 2, an operational flowchart illustrating an operational flowchart illustrating an initialization process 200 is depicted according to at least one embodiment. At 202, the ABDC program 110A, 110B receives data from sensors. According to an example embodiment, the ABDC program 110A, 110B, during initialization, may request a user to opt in for the services either by themselves. Then, the ABDC program 110A, 110B may use all of the available sensors, such as the location sensor 118 to collect data about the environment. In another embodiment, the ABDC program 110A, 110B may request an upload of available photographs or 3D maps of the environment that include furniture, their corresponding height and all of the available appliances or equipment connected to the communication network 114.

Next, at 204, the ABDC program 110A, 110B generates environment data from the received data. According to an example embodiment, the ABDC program 110A, 110B may analyze the received data, such as photographs, using a machine learning approach, such as a trained neural network in order to convert photographs into a plan of the environment that includes heights above a ceiling level of different objects in the environment and save it in the environment data 122. In another embodiment, the ABDC program 110A, 110B may request the user to annotate each photograph or a 3D plan in order to identify the height and location of various objects in the environment, such as furniture, appliances, routers and other devices connected to the communication network 114, and save the identified heights and locations in the environment data 122.

Then, at 206, the ABDC program 110A, 110B determines user profile data. According to an example embodiment, the ABDC program 110A, 110B may access data on client computing device 102 to identify an altitude associated with the user such as height and an age of the user. For example, the ABDC program 110A, 110B may access medical records or analyze social network profiles using the trained neural network to determine user age and height. In another embodiment, the ABDC program 110A, 110B may utilize an altitude received from the location sensor 118 to determine a height and an age of the user. For example, when the client computing device 102 is a smart watch attached to the wrist, the altitude of the watch may be utilized to assume the movement of the wrist and using a trained neural network that was trained on previous users to convert the altitude of the location device into an estimated age and height of the user. In further embodiments, when the client computing device 102 is a geotag attached as a neckless to a child, the ABDC program 110A, 110B may identify the age and height using data stored on the geotag or using another trained neural network. Next, after determination of the age and height of a user, the ABDC program 110A, 110B may store the data in the user profile data 120. In further embodiments, the ABDC program 110A, 110B may use a graphical user interface (GUI) to receive a user input related to an age, height client device location on the body and other user data to store it in the user profile data 120.

Next, at 208, the ABDC program 110A, 110B determines device settings based on the environment and user profile.

According to an example embodiment, the ABDC program 110A, 110B may associate the environment with one or more predetermined classes such as whether the environment is a home, a classroom, a workspace, etc. Then, the ABDC program 110A, 110B may associate a specific restriction to an environment based on the age and the height of the user determined from the user profile data 120. In another embodiment, the ABDC program 110A, 110B may request a user to enter restrictions for each environment from the user using a GUI.

Then, at 210, the ABDC program 110A, 110B creates profiles for different channels from the device settings. According to an example embodiment, the ABDC program 110A, 110B may arrange available wireless network channels by the determined altitude of the client device or height of the users where each channel has an associated device control settings and restrictions and store it in the channel profiles 124 for each environment. The altitude or a height values may be a range of values. For example, the ABDC program 110A, 110B may assign channel 1 to everyone whose height is less than four feet and where device control settings of channel 1 restrict any appliances that may be controlled by someone who is connected to channel 1. As another example, the ABDC program 110A, 110B may create a profile for channel 5 that has an associated altitude range from a height of a chair to the height of the table in the environment thus enabling to set specific instructions to every device that is either on the table or in the pocket of the user, such as muting any calls if the environment is a conference room.

Figure 3:
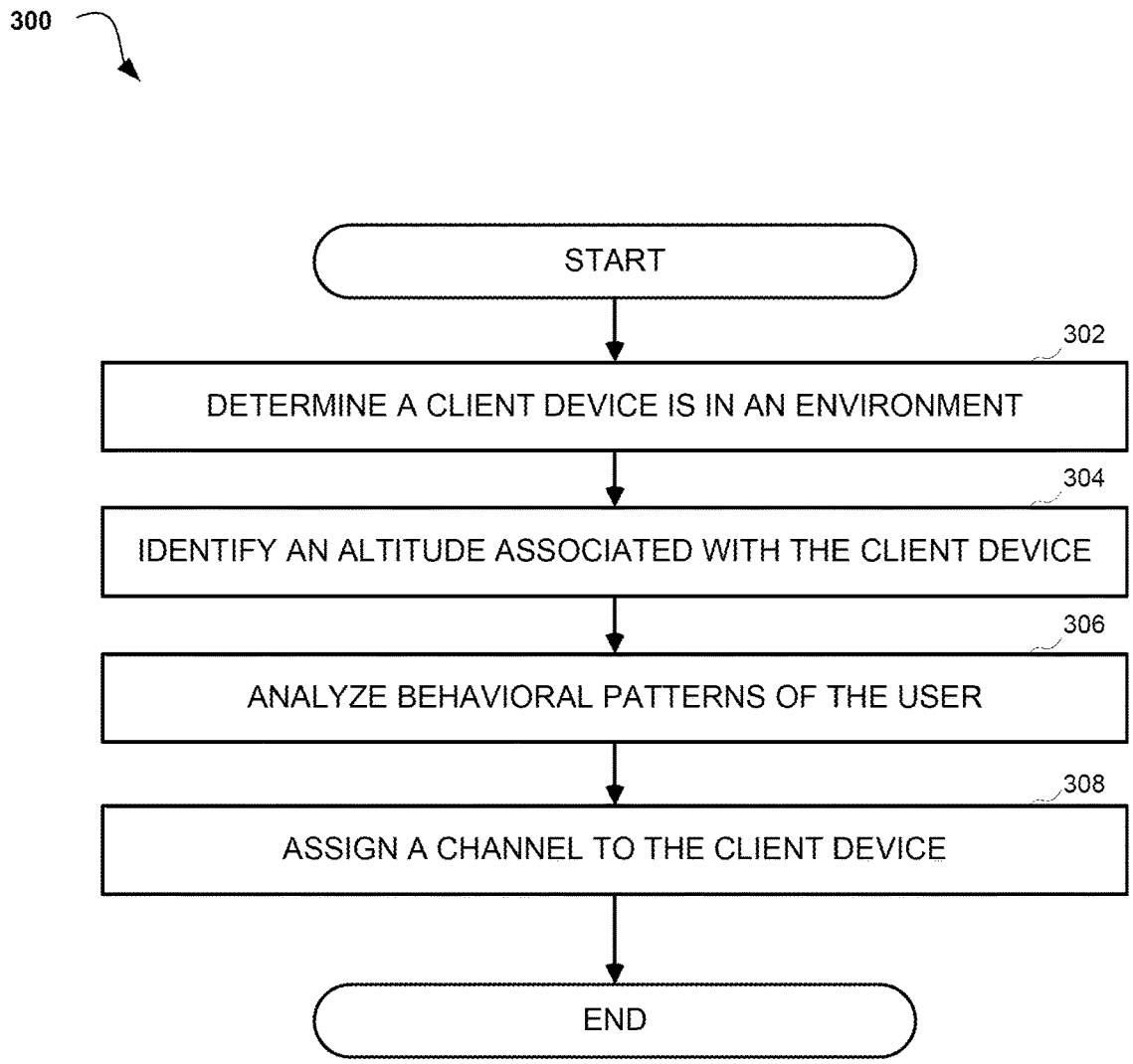
FIG. 3 is an operational flowchart illustrating an altitude-based device control process according to at least one embodiment.

Referring now to FIG. 3, an operational flowchart illustrating an altitude-based device control process 300 is depicted according to at least one embodiment. At 302, the ABDC program 110A, 110B determines a client device is in an environment. According to an example embodiment, the ABDC program 110A, 110B may determine that the device is in the environment if the device is connected to equipment enabling the communication network 114 in the environment, such as a router, a hot spot or other network enabling device. In another embodiment, the ABDC program 110A, 110B may determine a location of the client device using the location sensor 118.

Next, at 304, the ABDC program 110A, 110B identifies an altitude associated with the client device. According to an example embodiment, the ABDC program 110A, 110B may determine the altitude range of the client device using the location sensor 118. Concurrently, the ABDC program 110A, 110B may access user profile data 120 associated with the client computing device and compare the typical altitude dependent on the height of the user recorded in the user profile data 120 with the altitude range. When the altitude range deviates from the altitude determined from the user profile data 120, the ABDC program 110A, 110B may flag the computing device that represents that the other user is using the client device.

Then, at 306, the ABDC program 110A, 110B analyzes behavioral patterns of the user. According to an example embodiment, the ABDC program 110A, 110B may analyze behavioral patterns of the user such as a speed and frequency of change of the location and altitude of the client device using a separately trained neural network in order to determine an age and height of the user. For example, a child will constantly run in the environment while an adult will move only for a specific purpose, such as operating devices or using furniture. When the computing device is flagged (see step 304 above) the ABDC program 110A, 110B may update the user profile data 120. In another embodiment, the ABDC program 110A, 110B may analyze speech, tone or activity of a user to identify if the device settings or a channel needs to be switched for a certain client device.

Next, at 308, the ABDC program 110A, 110B assigns a channel to the client device. According to an example embodiment, the ABDC program 110A, 110B may use either the altitude or a derived height of the user to assign a channel for the computing device from the channel profiles 124. In another embodiment, the ABDC program 110A, 110B may display the channel and associated settings to the user.

It may be appreciated that FIGS. 2-3 provide only an illustration of one implementation and does not imply any limitations with regard to how different embodiments may be implemented. Many modifications to the depicted environments may be made based on design and implementation requirements.

Figure 4:
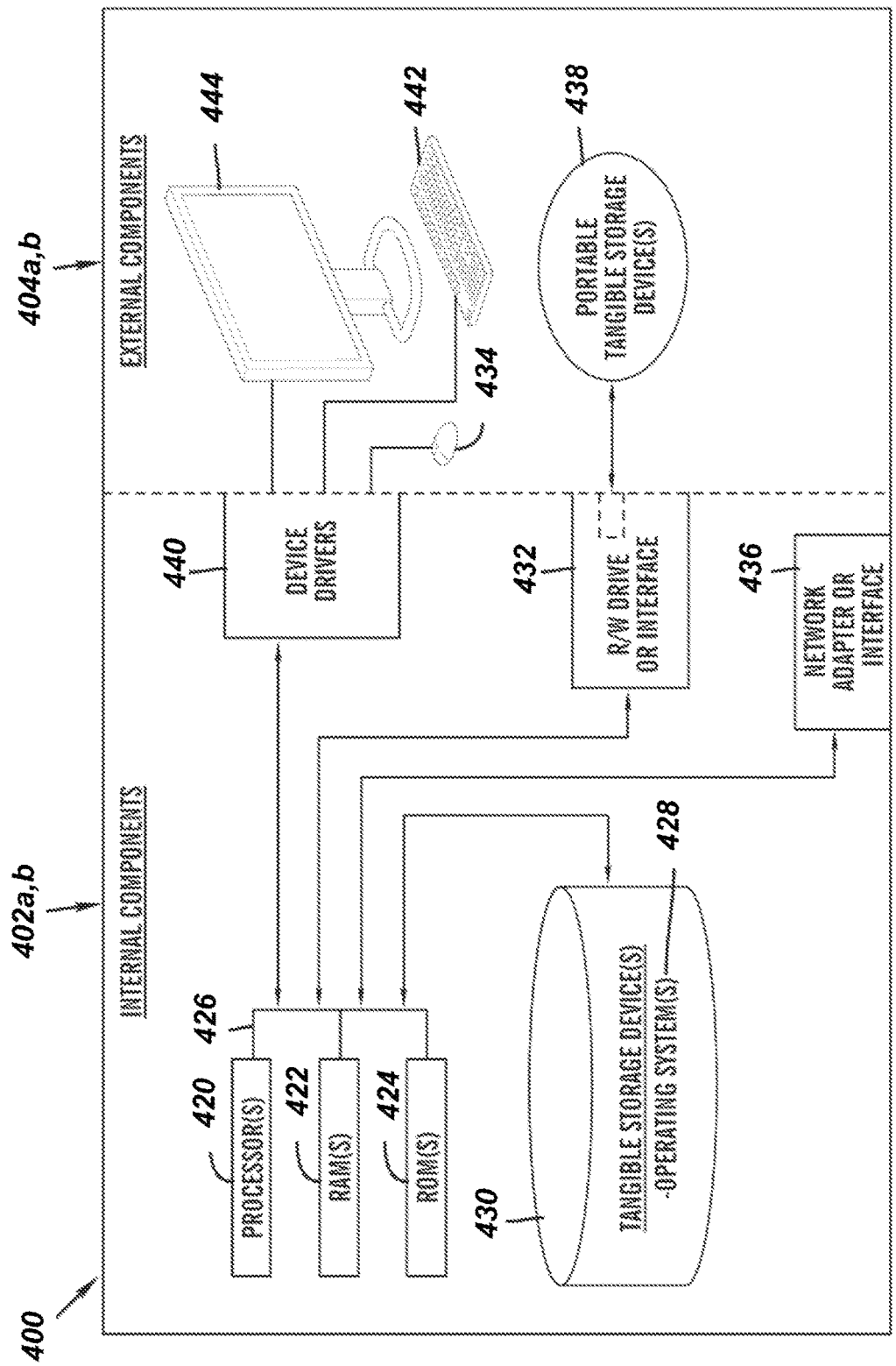
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the ABDC program 110A in the client computing device 102, and the ABDC program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the ABDC program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the ABDC program 110A in the client computing device 102 and the ABDC program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the ABDC program 110A in the client computing device 102 and the ABDC program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
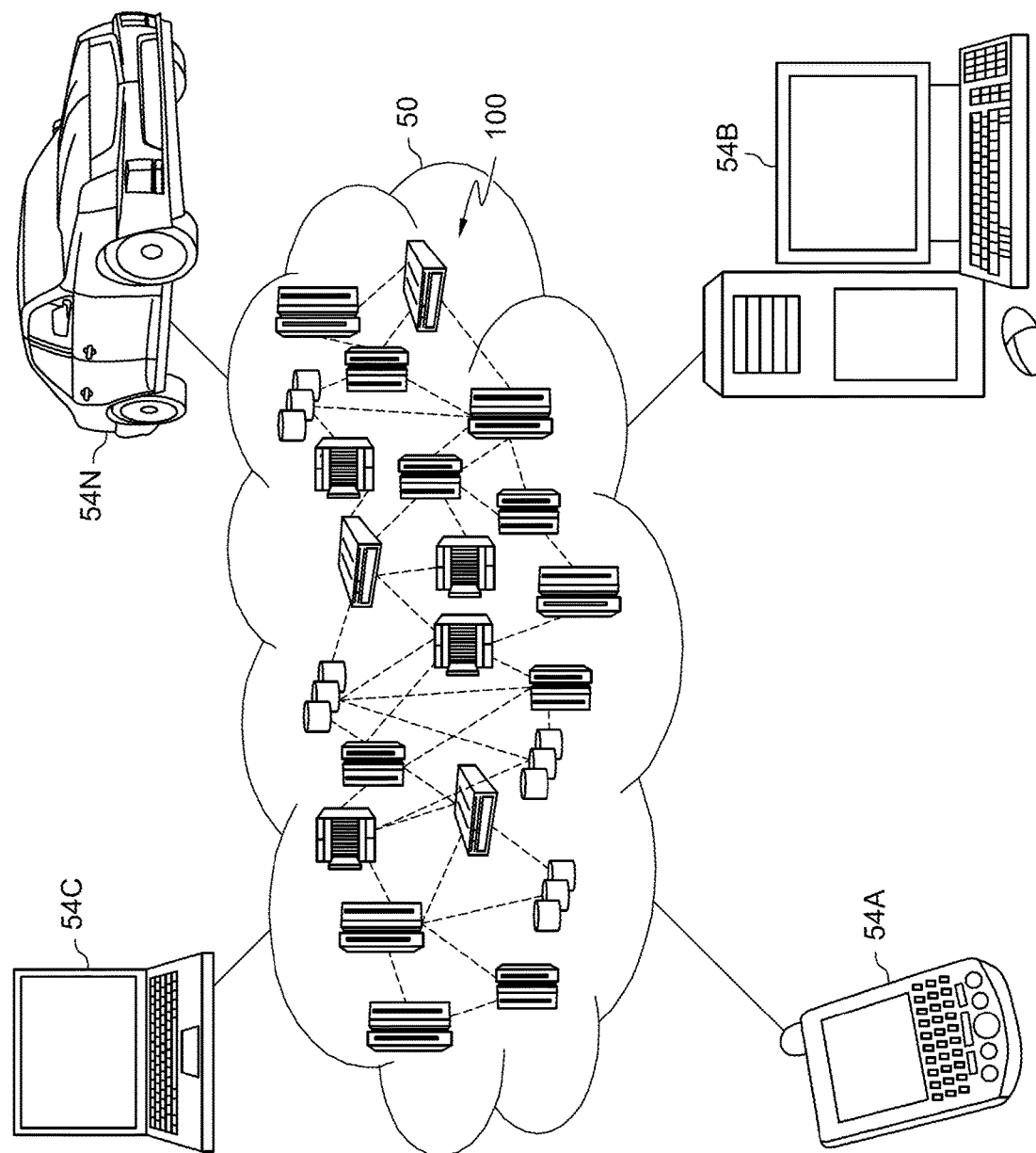
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
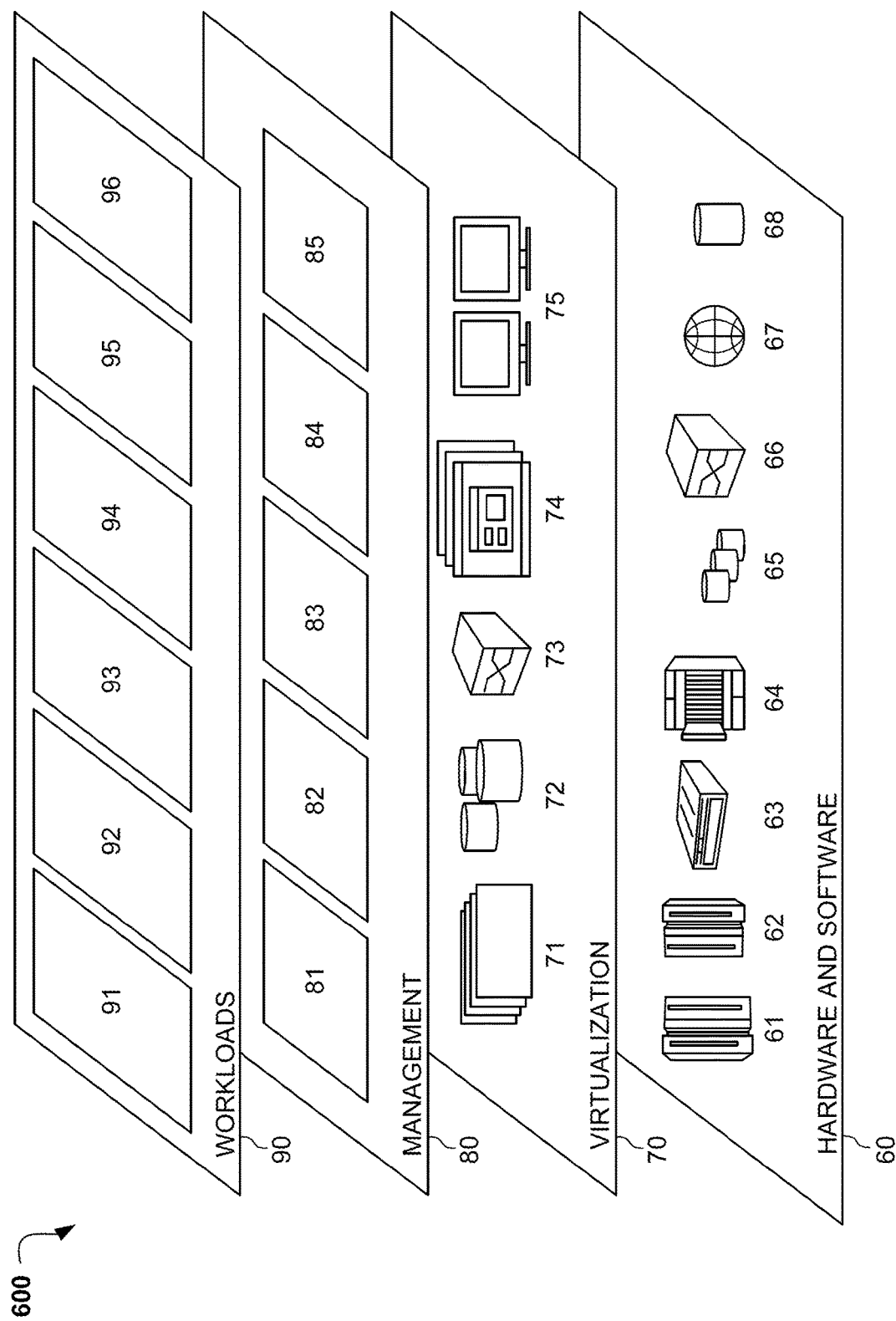
FIG. 6 depicts abstraction model layers according to an embodiment of the present invention.

Referring now to FIG. 6, a set of functional abstraction layers 500 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and altitude-based device control 96. Altitude-based device control 96 may relate to determining an altitude of a client computing device and by deriving a height and age of a user from the altitude, assigning an appropriate wireless channel to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for an altitude-based device control, the method comprising:
   in response to a client device being detected in an environment, accessing profile data associated with the client device;
   comparing a height of a user and an altitude range associated with the client device as recorded in the associated profile data with a detected altitude range of the client device above a floor;
   flagging the client device, based on the altitude range deviating from that in the associated profile data;
   in response to the client device being flagged, determining an age and a height of the user from an analysis of behavioral patterns, speech and tone, using a trained neural network; and
   assigning a wireless network channel to the client device based on a security profile of the wireless network channel matching the analyzed behavioral patterns and the associated profile data.

2. The processor-implemented method of claim 1, wherein determining the age and the height of the user using the trained neural network from the client device and the location data further comprises:
   analyzing behavioral patterns of the user based on a speed and frequency of change in the location data.

3. The processor-implemented method of claim 2, wherein determining the age and the height of the user using the trained neural network from the client device and the location data further comprises:
   determining whether the wireless network channel should be switched based on an analysis of speech, tone, and activity of the user.

4. The processor-implemented method of claim 1, wherein determining the altitude of the client device above the floor from the location data is based on a digital representation of a 3D map of an environment where the client device is located.

5. The processor-implemented method of claim 1, wherein the wireless network channel has associated restrictions and device control settings applied to the client device.

6. The processor-implemented method of claim 1, further comprising:

based on determining a range of the altitude in a user profile varies from the altitude of the client device:
flagging the client device as used by a new user; and
updating the user profile.

7. The processor-implemented method of claim 1, wherein the one or more location sensors are selected form a group consisting of an accelerometer, a barometer, a wireless antenna capable of identifying a location using triangulation, a camera, a LIDAR, and a global positioning sensor.

8. A computer system for an altitude-based device control, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprises:
in response to a client device being detected in an environment, accessing profile data associated with the client device;
comparing a height of a user and an altitude range associated with the client device as recorded in the associated profile data with an altitude range of the client device above a floor;
flagging the client device, based on the altitude range deviating from the that in the associated profile data;
in response to the client device being flagged, determining an age and a height of the user from an analysis of behavioral patterns, speech and tone, using a trained neural network; and
assigning a wireless network channel to the client device based on a security profile of the wireless network channel matching the analyzed behavioral patterns and the associated profile data.

9. The computer system of claim 8, wherein determining the age and the height of the user using the trained neural network from the client device and the location data further comprising:
analyzing behavioral patterns of the user based on a speed and frequency of change in the location data.

10. The computer system of claim 9, wherein determining the age and the height of the user using the trained neural network from the client device and the location data further comprises:
determining whether the wireless network channel should be switched based on an analysis of speech, tone, and activity of the user.

11. The computer system of claim 8, wherein determining the altitude of the client device above the floor from the location data is based on a digital representation of a 3D map of an environment where the client device is located.

12. The computer system of claim 8, wherein the wireless network channel has associated restrictions and device control settings applied to the client device.

13. The computer system of claim 8, further comprising:
based on determining a range of the altitude in a user profile varies from the altitude of the client device:
flagging the client device as used by a new user; and
updating the user profile.

14. The computer system of claim 8, wherein the one or more location sensors are an accelerometer, a barometer, a wireless antenna capable of identifying a location using triangulation, a camera, a LIDAR, and a global positioning sensor.

15. A computer program product for an altitude-based device control, the computer program product comprising:
one or more computer-readable tangible storage medium and program instructions stored on at least one of the one or more tangible storage medium, the program instructions executable by a processor of a computer to perform a method, the method comprising:
in response to a client device being detected in an environment, accessing profile data associated with the client device;
comparing a height of a user and an altitude range associated with the client device as recorded in the associated profile data with an altitude range of the client device above a floor;
flagging the client device, based on the altitude range deviating from the that in the associated profile data;
in response to the client device being flagged, determining an age and a height of the user from an analysis of behavioral patterns, speech and tone, using a trained neural network; and
assigning a wireless network channel to the client device based on a security profile of the wireless network channel matching the analyzed behavioral patterns and the associated profile data.

16. The computer program product of claim 15, wherein program instructions to determine the age and the height of the user using the trained neural network from the client device and the location data further comprises:
analyzing behavioral patterns of the user based on a speed and frequency of change in the location data.

17. The computer program product of claim 16, wherein determining the age and the height of the user using the trained neural network from the client device and the location data further comprises:
determining whether the wireless network channel should be switched based on an analysis of speech, tone, and activity of the user.

18. The computer program product of claim 15, wherein determining the altitude of the client device above the floor from the location data is based on a digital representation of a 3D map of an environment where the client device is located.

19. The computer program product of claim 15, wherein the wireless network channel has associated restrictions and device control settings applied to the client device.

20. The computer program product of claim 15, further comprising:
based on determining a range of the altitude in a user profile varies from the altitude of the client device:
flagging the client device as used by a new user; and
updating the user profile.

* * * * *